United States Patent
Watakabe et al.

(10) Patent No.: US 7,878,159 B2
(45) Date of Patent: Feb. 1, 2011

(54) STEAM GENERATOR AND METHOD OF ADJUSTING FLOW RESISTANCE OF COOLING WATER IN STEAM GENERATOR

(75) Inventors: Hisato Watakabe, Hyogo (JP); Tomoyuki Inoue, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 439 days.

(21) Appl. No.: 12/063,914

(22) PCT Filed: Nov. 20, 2006

(86) PCT No.: PCT/JP2006/323119

§ 371 (c)(1),
(2), (4) Date: Feb. 15, 2008

(87) PCT Pub. No.: WO2007/060915

PCT Pub. Date: May 31, 2007

(65) Prior Publication Data

US 2009/0260584 A1    Oct. 22, 2009

(30) Foreign Application Priority Data

Nov. 28, 2005   (JP)   ............... 2005-342411

(51) Int. Cl.
    *F16L 55/10*    (2006.01)
(52) U.S. Cl. .............. 122/459; 138/40; 138/89
(58) Field of Classification Search ........... 122/32, 122/33, 459; 165/96, 159; 138/37, 40, 89, 138/93
    See application file for complete search history.

(56) References Cited

U.S. PATENT DOCUMENTS

| | | | | |
|---|---|---|---|---|
| 3,651,789 A * | 3/1972 | Giardina | ............ | 122/32 |
| 3,918,409 A * | 11/1975 | Schroder | ............ | 122/32 |
| 3,983,903 A * | 10/1976 | Kuehn, Jr. | ............ | 138/40 |
| 4,671,326 A * | 6/1987 | Wilhelm et al. | ............ | 138/93 |
| 4,690,172 A * | 9/1987 | Everett | ............ | 138/89 |
| 4,905,630 A * | 3/1990 | Weber | ............ | 122/32 |
| 5,171,514 A * | 12/1992 | Veronesi et al. | ............ | 376/204 |
| 5,419,391 A * | 5/1995 | Chan et al. | ............ | 165/159 |
| 5,695,003 A * | 12/1997 | Ashton et al. | ............ | 165/76 |
| 5,764,717 A * | 6/1998 | Rootham | ............ | 376/316 |
| 5,867,547 A * | 2/1999 | Lee | ............ | 376/204 |
| 6,173,680 B1 * | 1/2001 | Dague et al. | ............ | 122/441 |
| 7,000,571 B2 * | 2/2006 | Doule et al. | ............ | 122/32 |

FOREIGN PATENT DOCUMENTS

| | | |
|---|---|---|
| JP | 54-134591 U | 9/1980 |
| JP | 55-134591 U | 9/1980 |

(Continued)

OTHER PUBLICATIONS

International Search Report of PC/JP2006/323119, date of mailing Feb. 20, 2007.

*Primary Examiner*—Gregory A Wilson
(74) *Attorney, Agent, or Firm*—Westerman, Hattori, Daniels & Adrian, LLP

(57) ABSTRACT

In a steam generator, a flow resistance adjusting unit for a primary cooling water is provided in an inlet nozzle provided at an incoming water chamber or an outlet nozzle provided at an outgoing water chamber.

4 Claims, 6 Drawing Sheets

FOREIGN PATENT DOCUMENTS

| | | |
|---|---|---|
| JP | 62-226017 A | 10/1987 |
| JP | 1-235897 A | 9/1989 |
| JP | 4-290683 A | 10/1992 |
| JP | 5-52990 A | 3/1993 |
| JP | 5-196792 A | 8/1993 |
| JP | 7-120586 A | 5/1995 |
| JP | 9-222202 A | 8/1997 |
| JP | 10-38209 A | 2/1998 |
| JP | 2000-346306 A | 12/2000 |
| JP | 2002-349515 A | 12/2002 |
| WO | 98/38002 A1 | 9/1998 |

* cited by examiner

FLOW RESISTANCE ADJUSTING PLATE 51
INLET NOZZLE 43
52
GRINDING TOOL 101
51a
52a

WELD PADDING 111
INLET NOZZLE 43
112
GRINDING TOOL 101
111
112

STEAM GENERATOR AND METHOD OF ADJUSTING FLOW RESISTANCE OF COOLING WATER IN STEAM GENERATOR

TECHNICAL FIELD

The present invention relates to a steam generator used as a heat exchanger for a nuclear power plant and a method of adjusting flow resistance of cooling water in this steam generator.

BACKGROUND ART

For example, a pressurized water reactor (PWR: Pressurized Water Reactor), using light water as a reactor coolant and a neutron moderator, runs it as non-boiling, high-temperature and high-pressure water throughout a reactor core, sends the high-temperature and high-pressure water to a steam generator for generation of steam by heat exchange, and sends the steam to a turbine generator for generation of electricity. The pressurized water reactor transfers the heat of high-temperature and high-pressure primary cooling water to secondary cooling water by way of the steam generator, generating the steam from the secondary cooling water. In the steam generator, the primary cooling water flows inside a large number of narrow heat-transfer tubes, and the heat of the primary cooling water is transferred to the secondary cooling water flowing outside the heat-transfer tubes, thereby generating the steam, which causes the turbine to rotate for generating electricity.

In the steam generator, a tube bank external cylinder is arranged inside a sealed hollow barrel with a predetermined space from the inner wall thereof, a plurality of heat-transfer tubes of an inverted U shape are arranged inside the tube bank external cylinder, with each heat-transfer tube having its end supported by a tube support and its middle part supported by a plurality of tube supporting plates that are supported by stay-rods extending from the tube support, and an incoming water chamber and an outgoing water chamber are formed at the lower end of the barrel.

Therefore, the primary cooling water is supplied from a cooling water pipe to the plurality of heat-transfer tubes through the incoming water chamber, while the secondary cooling water is supplied to the inside of the barrel from a water supply pipe provided at the upper part of the barrel. Then, heat exchange is performed between the primary cooling water (hot water) flowing inside the plurality of heat-transfer tubes and the secondary cooling water (cold water) circulating inside the barrel, so that the secondary cooling water absorbs the heat and the steam is generated. Then, the generated steam is discharged from the upper end of the barrel, while the primary cooling water after the heat exchange is discharged from the outgoing water chamber to the cooling water pipe.

This type of steam generator is described in Patent Document 1.

Patent Document 1: Japanese Patent Application Laid-Open No. H01-235897

DISCLOSURE OF INVENTION

Problem to be Solved by the Invention

In the steam generator mentioned above, some heat-transfer tubes in a heat-transfer tube group corrode or deteriorate due to a long use or suffer damage due to mechanical stress, and when damage or the like of the heat-transfer tube are detected by a periodical inspection or the like, the heat-transfer tubes with the damage or the like are made unusable by closing. However, when some heat-transfer tubes in the heat-transfer tube group are made unusable, the flow resistance of the steam generator increases, and the flow rate of the primary cooling water flowing in the heat-transfer tube group is decreased. As a result, the heat recovery efficiency of the heat from the primary cooling water is lowered.

As the steam generator is used for about 20 to 30 years, the heat-transfer tube that is closed and is unusable increases in number, so that the flow resistance increases and the heat recovery efficiency is further lowered. Therefore, the work is undertaken to replace the steam generator itself. In this case, while it is needed to design so that the flow resistance of a steam generator to be newly installed, namely, the flow rate of the primary cooling water is an appropriate amount in accordance with the existing nuclear power plant, it is difficult to maintain the flow resistance while following the existing design and reduce manufacturing cost. For this reason, the flow resistance of the primary cooling water may change between the new nuclear power plant with the steam generator exchanged and the existing nuclear power plant, which may result in lowering the heat recovery efficiency.

Furthermore, in carrying out the work to replace the steam generator, downsizing is intended by reducing the number of the heat-transfer tubes, while there is a desire to install the steam generator capable of maintaining or enhancing the heat recovery efficiency. In this case, it is difficult to design the steam generator in which the number of heat-transfer tubes is decreased and the flow resistance is set to enhance heat recovery efficiency, for the existing nuclear power plant.

While it is disclosed in the above-mentioned Patent Document 1 that the steam flow rate is calculated based on pressure of the steam generated in a reactor pressure vessel, the flow resistance of the steam cannot be adjusted.

The present invention is intended to solve the above problems, and an object of the present invention is to provide a steam generator capable of restraining a reduction of heat recovery efficiency by adjusting flow resistance of primary cooling water flowing in a heat-transfer tube group and a method of adjusting the flow resistance of the cooling water in the steam generator.

Means for Solving Problem

In order to achieve the above objects, the steam generator according to the invention of claim 1 includes a hollow sealed barrel; a heat-transfer tube group that includes a plurality of heat-transfer tubes of an inverted U shape which is arranged inside the hollow sealed barrel and through which a primary cooling water flows; a tube support that is arranged at a lower part inside the hollow sealed barrel and supports ends of the heat-transfer tubes; an incoming water chamber that is provided at a lower end of the hollow sealed barrel and communicates with one ends of the heat-transfer tubes; an outgoing water chamber that is provided at the lower end of the hollow sealed barrel and communicates with other ends of the heat-transfer tubes; a secondary cooling-water supply channel that supplies a secondary cooling water to the hollow sealed barrel for performing heat exchange with the primary cooling water flowing in the heat-transfer tubes; and a flow resistance adjusting unit that is provided in at least one of an inlet nozzle provided at the incoming water chamber and an outlet nozzle provided at the outgoing water chamber.

In the steam generator according to the invention of claim 2, the flow resistance adjusting unit includes a plurality of flow resistance adjusting plates with different flow path areas detachably provided in at least one of the inlet nozzle and the outlet nozzle.

In the steam generator according to the invention of claim 3, the flow resistance adjusting unit includes a flow resistance adjusting gate arranged movably along a radial direction of at least one of the inlet nozzle and the outlet nozzle.

The steam generator according to the invention of claim 4 further includes a flowmeter that measures at least one of volume of supply water flowing from the inlet nozzle into the incoming water chamber and volume of drain water drained from the outgoing water chamber to the outlet nozzle, wherein the flow resistance adjusting unit operates the flow resistance adjusting gate based on at least one of the volume of the supply water and the volume of the drain water measured by the flowmeter.

In the steam generator according to the invention of claim 5, the flow resistance adjusting unit includes a plurality of flow resistance adjusting cylindrical pipes arranged detachably in at least one of the inlet nozzle and the outlet nozzle.

The method of adjusting flow resistance of a cooling water according to the invention of claim 6 implemented on a steam generator including a hollow sealed barrel; a heat-transfer tube group that includes a plurality of heat-transfer tubes of an inverted U shape which is arranged inside the hollow sealed barrel and through which a primary cooling water flows; a tube support that is arranged at a lower part inside the hollow sealed barrel and supports ends of the heat-transfer tubes; an incoming water chamber that is provided at a lower end of the hollow sealed barrel and communicates with one ends of the heat-transfer tubes; an outgoing water chamber that is provided at the lower end of the hollow sealed barrel and communicates with other ends of the heat-transfer tubes; and a secondary cooling-water supply channel that supplies a secondary cooling water to the hollow sealed barrel for performing heat exchange with the primary cooling water flowing in the heat-transfer tubes, the method includes adjusting at least one of the flow resistance of the primary cooling water flowing into the incoming water chamber and the flow resistance of the primary cooling water drained from the outgoing water chamber, in accordance with operating condition of the steam generator.

The method of adjusting the flow resistance of the cooling water in the steam generator according to the invention of claim 7, further includes stopping supply of the primary cooling water to the incoming water chamber; opening a manhole for any one of a worker and a working robot to enter at least one of the incoming water chamber and the outgoing water chamber; and adjusting at least one of an opening volume of the inlet nozzle and an opening volume of the outlet nozzle.

EFFECT OF THE INVENTION

According to the steam generator of the invention of claim 1, the steam generator is configured such that the heat-transfer tube group including the plurality of heat-transfer tubes of the inverted U shape within which the primary cooling water flows is arranged inside the sealed hollow barrel, the ends of the heat-transfer tubes are supported by the tube support fixed to the lower part inside the barrel, the incoming water chamber communicating with one ends of the heat-transfer tubes and the outgoing water chamber communicating with the other ends of the heat-transfer tubes are provided at the lower end of the barrel, and the secondary cooling water supply channel that supplies the secondary cooling water inside the barrel for the heat exchange with the primary cooling water flowing inside the heat-transfer tubes is provided, and the flow resistance adjusting unit is provided in at least either one of the inlet nozzle provided at the incoming water chamber and the outlet nozzle provided at the outgoing water chamber. Therefore, the flow resistance of the primary cooling water flowing in the heat-transfer tube group can be adjusted by adjusting the flow resistance of the primary cooling water flowing from the inlet nozzle into the incoming water chamber or the flow resistance of the primary cooling water drained from the outgoing water chamber to the outlet nozzle, by the flow resistance adjusting unit, with respect to the existing steam generator or the newly installed steam generator. Thus, it is possible to restrain reduction of the heat recovery efficiency in the existing steam generator and easily adjust the heat recovery efficiency in the newly installed steam generator.

According to the steam generator of the invention of claim 2, the flow resistance adjusting unit is implemented by the plurality of flow resistance adjusting plates with different flow path areas detachably provided in the inlet nozzle or the outlet nozzle. Therefore, the flow resistance of the primary cooling water can easily be adjusted by installing or removing the flow resistance adjusting plates.

According to the steam generator of the invention of claim 3, the flow resistance adjusting unit is implemented by the flow resistance adjusting gate provided movably along the radial direction of the inlet nozzle or the outlet nozzle. Therefore, the flow resistance of the primary cooling water can easily be adjusted by moving the flow resistance adjusting gate, and construction can be simplified.

According to the steam generator of the invention of claim 4, the flowmeter is provided that measures the volume of the supply water flowing from the inlet nozzle into the incoming water chamber or the volume of the drain water drained from the outgoing water chamber to the outlet nozzle, and the flow resistance adjusting gate is moved by the flow resistance adjusting unit, based on the supply water volume or the drain water volume as measured by the flowmeter. Therefore, the flow resistance of the primary cooling water can securely be adjusted to a proper value by moving the flow resistance adjusting gate based on the volume of the supply water or the drain water to or from the steam generator.

According to the steam generator of the invention of claim 5, the flow resistance adjusting unit is implemented by the plurality of flow resistance adjusting cylindrical pipes detachably arranged in the inlet nozzle or the outlet nozzle. Therefore, the flow resistance of the primary cooling water can easily be adjusted by installing or removing the flow resistance adjusting cylindrical pipes, and the water supply and the water drainage can stably be performed.

According to the method of adjusting the flow resistance of the cooling water in the steam generator of the invention of claim 6, the flow resistance of the primary cooling water flowing into the incoming water chamber or drained from the outgoing water chamber is adjusted depending on the operating condition of the steam generator. Therefore, the flow resistance of the primary cooling water flowing in the heat-transfer tube group can easily be adjusted by adjusting the flow resistance of the primary cooling water flowing from the inlet nozzle into the incoming water chamber or the flow resistance of the primary cooling water drained from the outgoing water chamber to the outlet nozzle by the flow resistance adjusting unit, with respect to the existing steam generator or the newly installed steam generator.

According to the method of adjusting the flow resistance of the cooling water in the steam generator of the invention of in claim 7, the manhole is opened for a worker or a working robot to enter the incoming water chamber or the outgoing water chamber, and the opening volume of the inlet nozzle or the outlet nozzle is adjusted, in a state that the water supply of the primary cooling water to the incoming water chamber is stopped. Therefore, the flow resistance of the primary cooling water can easily be adjusted after the safety is secured.

Figure 1:
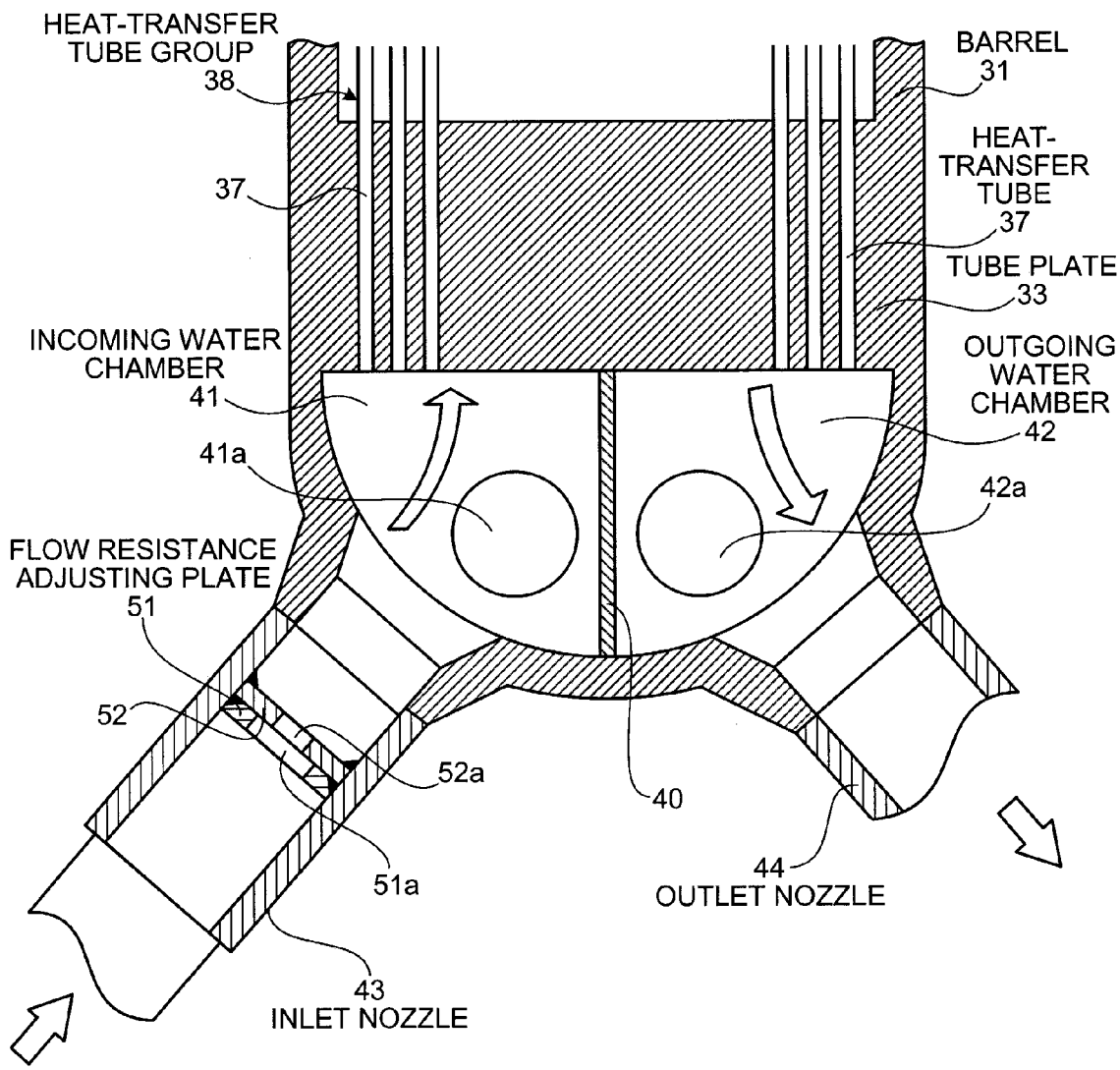
FIG. 1 is a cross section of relevant parts of a structure of a water chamber in a steam generator according to a first embodiment of the present invention.

EXPLANATIONS OF LETTERS OR NUMERALS 13 steam generator
31 barrel
32 tube bank external cylinder
33 tube support
35 tube supporting plate
37 heat-transfer tube
38 heat-transfer tube group
41 incoming water chamber
42 outgoing water chamber
41a, 42a manhole
43 inlet nozzle
44 outlet nozzle
49 water supply channel
51, 52, 61, 62, 63, 64 flow resistance adjusting plate (flow resistance adjusting unit)
51a, 52a, 61a, 62a, 63a, 64a through hole
53, 65, 66, 67 fastening bolt
71, 81, 82 flow resistance adjusting gate (flow resistance adjusting unit)
73 driving device
75, 90 control device
76 flowmeter
85, 86 compression coil spring
87 power source unit
88, 89 coil
91, 92, 93 flow resistance adjusting cylindrical pipe (flow resistance adjusting unit)
101 grinding tool
111, 112 weld padding

BEST MODE(S) FOR CARRYING OUT THE INVENTION

In the following, exemplary embodiments of a steam generator and a method of adjusting flow resistance of cooling water in the steam generator according to the present invention are explained in detail with reference to accompanying drawings. The present invention is not to be limited by these embodiments.

First Embodiment

Figure 2:
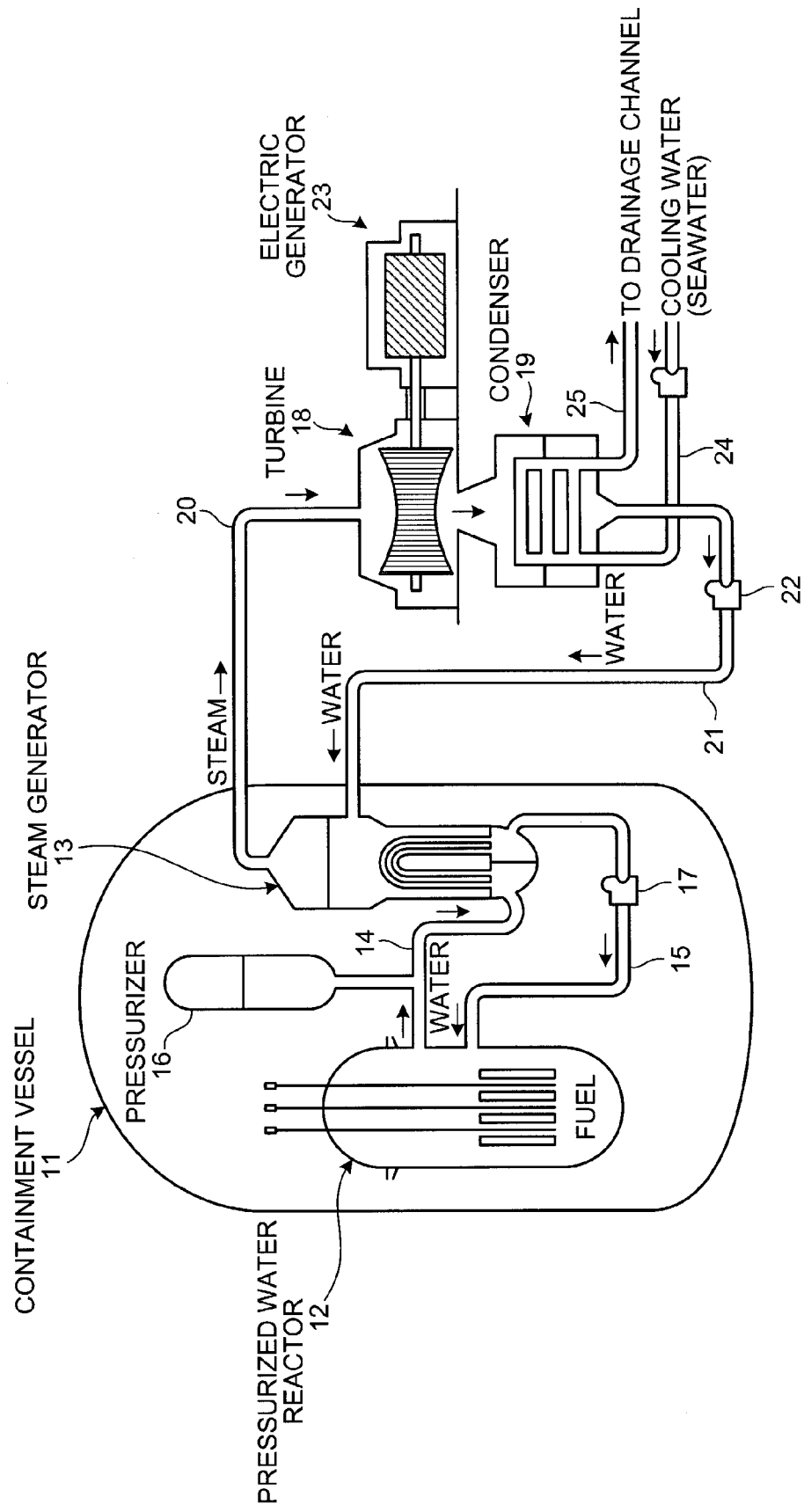
FIG. 2 is a schematic configuration diagram of electric power facilities having a pressurized water reactor to which the steam generator of the first embodiment is applied.
Figure 3:
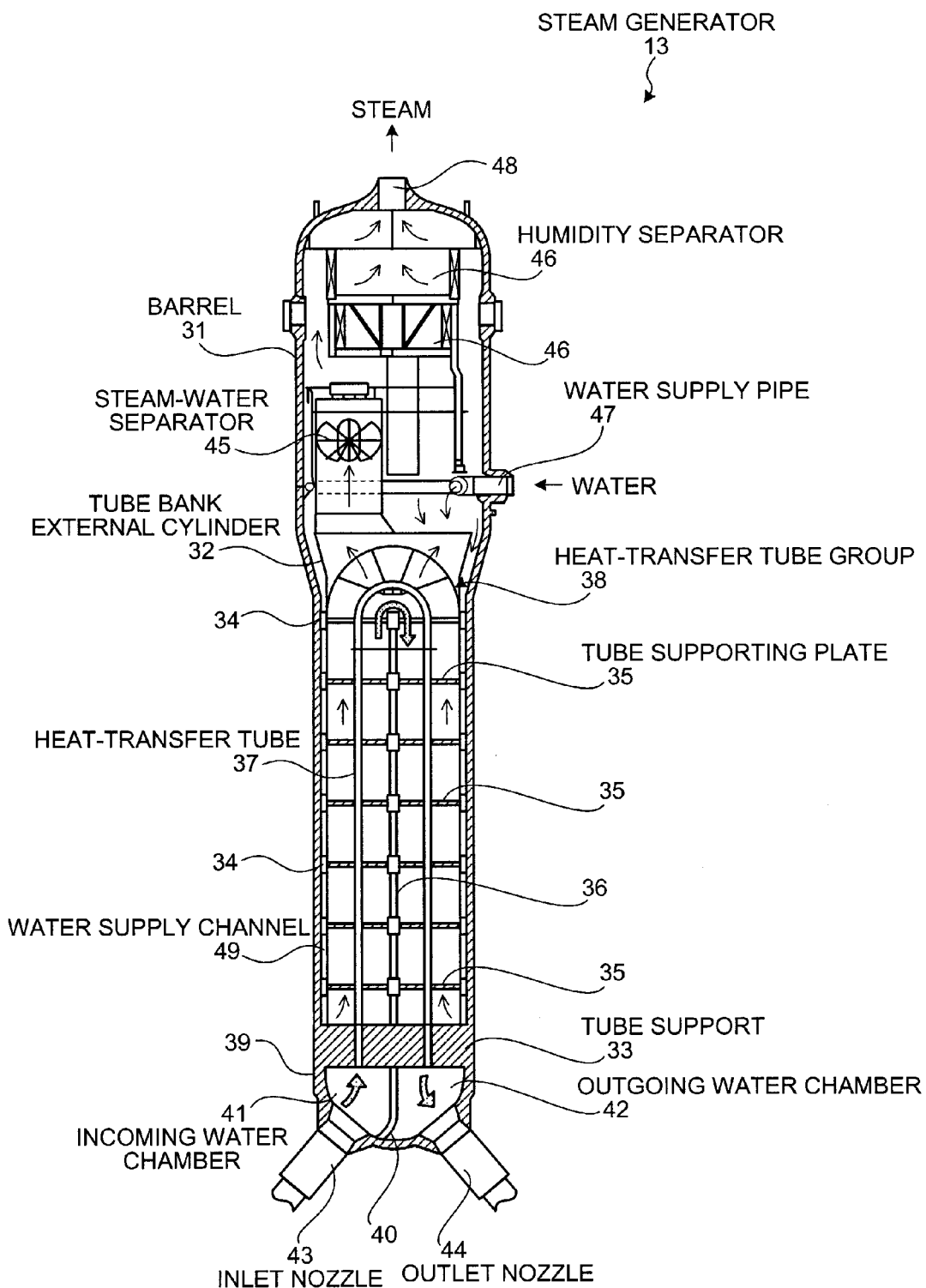
FIG. 3 is a schematic configuration diagram of the steam generator of the first embodiment.

FIG. 1 is a cross sectional of relevant parts of a structure of a water chamber in a steam generator according to a first embodiment of the present invention; FIG. 2 is a schematic configuration diagram of electric power facilities having a pressurized water reactor to which the steam generator of the first embodiment is applied; and FIG. 3 is a schematic configuration diagram of the steam generator of the first embodiment.

The reactor of the first embodiment is the pressurized water reactor (PWR: Pressurized Water Reactor) that, using light water as a reactor coolant and a neutron moderator, runs it as non-boiling, high-temperature and high-pressure water throughout a reactor core, sends the high-temperature and high-pressure water to the steam generator for generation of steam by heat exchange, and sends the steam to a turbine generator for generation of electricity.

Namely, in the electric power facilities having the pressurized water reactor, as shown in FIG. 2, a containment vessel 11 houses a pressurized water reactor 12 and a steam generator 13, the pressurized water reactor 12 and the steam generator 13 are connected by way of cooling water pipes 14 and 15, and the cooling water pipe 14 is provided with a pressurizer 16, and the cooling water pipe 15 is provided with a cooling water pump 17. In this case, the light water is used as moderator and primary cooling water and a primary cooling system is given a high pressure on the order of 150 to 160 atmospheres by the pressurizer 16 to restrain boiling of the primary cooling water at the reactor core. Therefore, in the pressurized water reactor 12, the light water as primary cooling water is heated by low enriched uranium or MOX as fuel, and the light water at high temperature is sent to the steam generator 13 through the cooling water pipe 14 while maintained at predetermined high pressure by the pressurizer 16. At the steam generator 13, heat exchange is made between the light water at high pressure and high temperature and the water as secondary cooling water, and the light water cooled down is sent back to the pressurized water reactor 12 through the cooling water pipe 15.

The steam generator 13 is connected to a turbine 18 and a condenser 19 provided outside the containment vessel 11 by way of cooling water pipes 20 and 21, and the cooling water pipe 21 is provided with a feed pump 22. The turbine 18 is connected to an electric generator 23, and the condenser 19 is connected to a supply pipe 24 and a drain pipe 25 that supply and drain the cooling water (for example, seawater). Therefore, the steam generated by the heat exchange with the high-pressure and high-temperature light water at the steam generator 13 is sent to the turbine 18 through the cooling water pipe 20, and the steam drives the turbine 18, so that the electric generator 23 generates electricity. The steam, after driving the turbine 18, is cooled down by the condenser 19 and then is sent back to the steam generator 13 through the cooling water pipe 21.

In the steam generator 13 in the electric power facilities having the pressurized water reactor, as shown in FIG. 3, a barrel 31 is sealed, has a hollow cylindrical shape, and has a diameter somewhat smaller at the lower part than at the upper part. Inside the barrel 31, a tube bank external cylinder 32 of a cylindrical shape is arranged with a predetermined space from the inner wall of the barrel 31, and its lower end is extended up to the vicinity of a tube support 33. The tube bank external cylinder 32 is supported by a plurality of jack assemblies 34 at a position with predetermined distances from the barrel 31 in a longitudinal direction and a circumferential direction.

In the tube bank external cylinder 32, a plurality of tube supporting plates 35 are arranged at the heights corresponding to those of the jack assemblies 34 and are supported by a plurality of stay-rods 36 extending upward from the tube support 33. Inside the tube bank external cylinder 32, a heat-transfer tube group 38 including a plurality of heat-transfer tubes 37 of an inverted U shape is arranged. Each heat-transfer tube 37 has its end passed through and supported by the tube support 33 and its middle part supported by the plurality of tube supporting plates 35. In this case, the tube supporting plate 35 has a large number of through holes (not shown) formed, and each heat-transfer tube 37 runs through the through hole in a non-contact state.

A lower hemisphere mirror part 39 is fixed to the lower end of the barrel 31, has its inside partitioned into an incoming water chamber 41 and an outgoing water chamber 42 by a bulkhead 40, and has an inlet nozzle 43 and an outlet nozzle 44 connected to the incoming water chamber 41 and the outgoing water chamber 42. The incoming water chamber 41 communicates with one end of each heat-transfer tube 37, and the outgoing water chamber 42 communicates with the other end of each heat-transfer tube 37. The cooling water pipe 14 is connected to the inlet nozzle 43, while the cooling water pipe 15 is connected to the outlet nozzle 44.

A steam-water separator 45 that separates supplied water into steam and hot water and a humidity separator 46 that removes humidity from thus separated steam to bring it to a state close to a dry steam are provided at the upper part of the barrel 31. At the barrel 31, a water supply pipe 47 for supplying the secondary cooling water inside the barrel 31 is inserted between the heat-transfer tube group 38 and the steam-water separator 45, and a steam outlet 48 is formed at the ceiling of the barrel 31. A water supply channel 49 is provided inside the barrel 31, along which the secondary cooling water supplied from the water supply pipe 47 into the barrel 31 flows down between the barrel 31 and the tube bank external cylinder 32, circulates upward at the tube support 33, and runs upward inside the heat-transfer tube group 38, thereby performing the heat exchange with the hot water (primary cooling water) flowing inside each heat-transfer tube 37. The cooling water pipe 21 is connected to the water supply pipe 47, while the cooling water pipe 20 is connected to the steam outlet 48.

Therefore, the primary cooling water heated by the pressurized water reactor 12 is sent from the inlet nozzle 43 to the incoming water chamber 41 of the steam generator 13 through the cooling water pipe 14, circulates through a large number of heat-transfer tubes 37, and flows to the outgoing water chamber 42. On the other hand, the secondary cooling water cooled by the condenser 19 is sent to the water supply pipe 47 of the steam generator 13 through the cooling water pipe 21 and runs through the water supply channel 49, performing the heat exchange with the hot water (primary cooling water) flowing in the heat-transfer tubes 37. Namely, inside the barrel 31, the heat exchange is performed between the high-pressure, high-temperature primary cooling water and the secondary cooling water, and the cooled primary cooling water is sent from the outgoing water chamber 42 back to the pressurized water reactor 12 through the cooling water pipe 15. On the other hand, the secondary cooling water that has performed the heat exchange with the high-pressure and high-temperature primary cooling water goes upward inside the barrel 31 and is separated by the steam-water separator 45 into the steam and the hot water, and the steam is sent to the turbine 18 through the cooling water pipe 20 after its humidity is removed by the humidity separator 46.

In the steam generator 13 configured as described above, in the present embodiment, a flow resistance adjusting unit is provided at the inlet nozzle 43, and the flow resistance of the primary cooling water running inside the steam generator 13 can be adjusted by adjusting the flow resistance of the primary cooling water flowing through the inlet nozzle 43 by the flow resistance adjusting unit.

Namely, as shown in FIG. 1, two flow resistance adjusting plates 51 and 52 as the flow resistance adjusting unit are fixed by welding to the inner wall face of the inlet nozzle 43. Because the flow resistance adjusting plates 51 and 52 have through holes 51a and 52a formed at the center having different inside diameters, the plates 51 and 52 have different flow path areas for the flow of the primary cooling water. In the present embodiment, the through hole 52a of the flow resistance adjusting plate 52 is set at a diameter smaller than that of the through hole 51a of the flow resistance adjusting plate 51. The water chambers 41 and 42 are provided with manholes 41a and 42a for inspection and maintenance works.

Therefore, with the two flow resistance adjusting plates 51 and 52 fixed by welding inside the inlet nozzle 43, the flow resistance of the primary cooling water flowing through the inlet nozzle 43 is set by the flow resistance adjusting plate 52, and the volume of the supply water to the incoming water chamber 41 is set by the through hole 52a of the flow resistance adjusting plate 52. When damage or the like to the heat-transfer tube 37 are detected in a periodic inspection or the like of the steam generator 13, a worker or a working robot enters the water chambers 41 and 42 through the manholes 41a and 42a and performs works of repairing or closing the heat-transfer tube 37.

At this moment, if some heat-transfer tubes 37 in the heat-transfer tube group 38 are closed and made unusable, the flow resistance of the steam generator 13 is increased and the flow rate of the primary cooling water flowing in the heat-transfer tube group 38 is decreased, thereby lowering the heat recovery efficiency of the heat from the primary cooling water. Therefore, the worker cuts away welded parts from the incoming water chamber with a work tool, and removes the flow resistance adjusting plate 52. Then, with only one flow resistance adjusting plate 51 left fixed inside the inlet nozzle 43, the flow resistance of the primary cooling water flowing through the inlet nozzle 43 is set by the flow resistance adjusting plate 51, and the volume of the supply water to the incoming water chamber 41 is set by the through hole 51a of the flow resistance adjusting plate 51. For this reason, the flow resistance at the inlet nozzle 43 is decreased, thereby decreasing the flow resistance of the steam generator 13 and increasing the flow rate of the primary cooling water flowing in the heat-transfer tube group 38, thereby restraining the reduction of the heat recovery efficiency of the heat from the primary cooling water.

When a large number of heat-transfer tubes 37 are made unusable, all of the flow resistance adjusting plates 51 and 52 can be removed. With this operation, it is possible to further reduce the flow resistance of the primary cooling water flowing through the inlet nozzle 43, thereby decreasing the flow resistance of the steam generator 13.

As above, in the steam generator of the first embodiment, the heat-transfer tube group 38 including the plurality of heat-transfer tubes 37 of the inverted U shape in which the primary cooling water flows is arranged inside the barrel 31, the ends of each heat-transfer tube 37 are supported by the tube support 33, the incoming water chamber 41 communicating with one end of each heat-transfer tube 37 and the outgoing water chamber 42 communicating with the other end of each heat-transfer tube 37 are provided by fixing the lower hemisphere mirror part 39 at the lower end of the barrel 31, and the two flow resistance adjusting plates 51 and 52 as the flow resistance adjusting unit for the primary cooling water are detachably provided in the inlet nozzle 43 provided at the incoming water chamber 41.

Therefore, in the steam generator 13, by adjusting the flow resistance of the primary cooling water flowing from the inlet nozzle 43 into the incoming water chamber 41 by the flow resistance adjusting plates 51 and 52, it is possible to adjust the flow resistance of the primary cooling water flowing in the heat-transfer tube group 38. Therefore, even if there is a decrease in the number of usable heat-transfer tubes 37, the reduction of the heat recovery efficiency can be restrained in the steam generator 13 by adjusting the flow resistance of the primary cooling water.

In the present embodiment, the flow resistance adjusting unit is implemented by the two flow resistance adjusting plates 51 and 52 of different flow path areas welded to the inner wall face of the inlet nozzle 43. Therefore, by individually removing the flow resistance adjusting plates 51 and 52 and decreasing the flow resistance at the inlet nozzle 43 according to the increase of the flow resistance of the primary cooling water in the heat-transfer tube group 38, the flow resistance of the primary cooling water can easily be adjusted throughout the entire steam generator 13.

Second Embodiment

Figure 4:
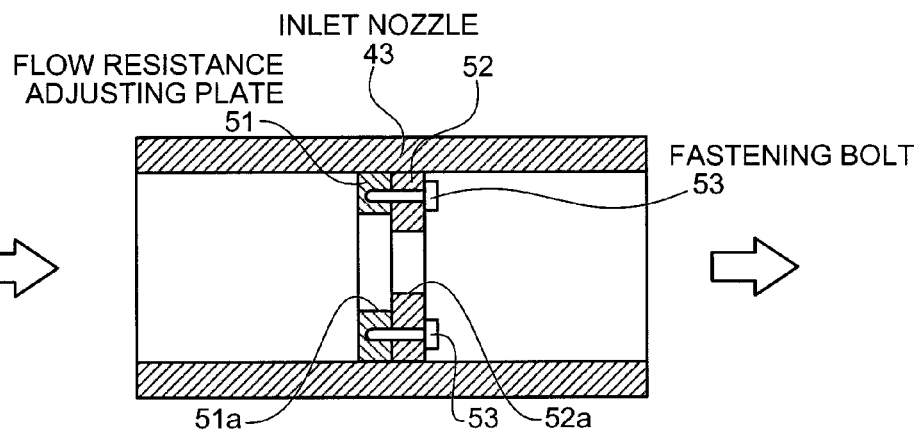
FIG. 4 is a cross section of an inlet nozzle of an incoming water chamber in a steam generator according to a second embodiment of the present invention.

FIG. 4 is a cross section of the inlet nozzle of the incoming water chamber in a steam generator of a second embodiment of the present invention. The member having the same function as that of the member described in the above-mentioned embodiment is given the same reference numeral, and an explanation thereof is omitted.

In the steam generator of the second embodiment, as shown in FIG. 4, two flow resistance adjusting plates 51 and 52 as the flow resistance adjusting unit are fixed with fastening bolts 53 to the inner wall face of the inlet nozzle 43. Therefore, the worker or the working robot can enter the incoming water chamber through the manhole and remove the flow resistance adjusting plate 52 by loosening the fastening bolts 53 with the work tool from the incoming water chamber.

As above, in the steam generator of the second embodiment, the two flow resistance adjusting plates 51 and 52 as the flow resistance adjusting unit for the primary cooling water are detachably provided in the inlet nozzle 43 provided at the incoming water chamber.

Therefore, by decreasing the flow resistance at the inlet nozzle 43 by loosening the fastening bolts 53 and thereafter removing the flow resistance adjusting plate 52, in accordance with an increase in the flow resistance of the heat-transfer tube group in the steam generator, the flow resistance of the primary cooling water can easily be adjusted throughout the entire steam generator.

Third Embodiment

Figure 5:
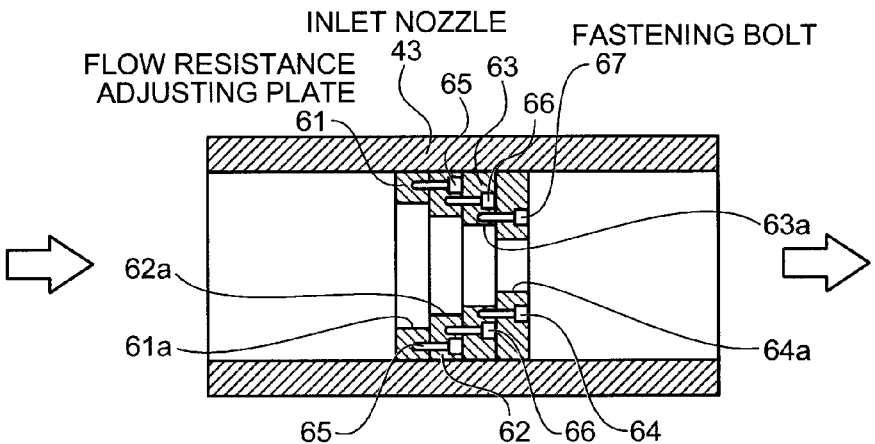
FIG. 5 is a cross section of the inlet nozzle of the incoming water chamber in a steam generator according to a third embodiment of the present invention.

FIG. 5 is a cross section of the inlet nozzle of the incoming water chamber in a steam generator according to a third embodiment of the present invention. The member having the same function as that of the member described in the above-mentioned embodiments is given the same reference numeral, and an explanation thereof is omitted.

In the steam generator of the third embodiment, as shown in FIG. 5, four flow resistance adjusting plates 61 to 64 as the flow resistance adjusting unit are fixed detachably with fastening bolts 65 to 67 to the inner wall face of the inlet nozzle 43. Because the flow resistance adjusting plates 61 to 64 have through holes 61a to 64a formed at the center having different inside diameters, the plates 61 to 64 have different flow path areas for the flow of the primary cooling water, and the through hole 64a of the flow resistance adjusting plate 64 is set at a diameter smaller than that of the through hole 61a of the flow resistance adjusting plate 61. Therefore, the worker or the working robot can enter the incoming water chamber through the manhole, and can remove the flow resistance adjusting plates 62 to 64 by loosening the fastening bolts 65 to 67 with the working tool from the incoming water chamber. In this case, the number of flow resistance adjusting plates to be removed out of the flow resistance adjusting plates 61 to 64 can be adjusted depending on the number of unusable heat-transfer tubes, and the flow resistance adjusting plate 61 as well can be removed as required.

As above, in the steam generator of the third embodiment, the four flow resistance adjusting plates 61 to 64 as the flow resistance adjusting unit for the primary cooling water are detachably arranged with the fastening bolts 65 to 67 in the inlet nozzle 43 provided at the incoming water chamber.

Therefore, by decreasing the flow resistance at the inlet nozzle 43 by loosening the fastening bolts 65 to 67 and thereafter removing a predetermined number of flow resistance adjusting plates out of the flow resistance adjusting plates 61 to 64, in accordance with an increase in the flow resistance of the heat-transfer tube group in the steam generator, the flow resistance of the primary cooling water can easily be adjusted throughout the entire steam generator, and the flow resistance of the primary cooling water can be finely adjusted in the steam generator.

In the first, second, and third embodiments mentioned above, the number of the flow resistance adjusting plates 51, 52, 61 to 65 is not to be limited to the number mentioned in each embodiment but can be set depending on the necessity. A new flow resistance adjusting plate can be fixed after removing the flow resistance adjusting plates 51, 52, 61 to 64. The method of fixing the flow resistance adjusting plates 51, 52, 61 to 64 is not limited to the welding and fastening bolts 53, 65 to 67, and different fixing methods can be employed so long as they can withstand water pressure of the primary cooling water.

Fourth Embodiment

Figure 6:
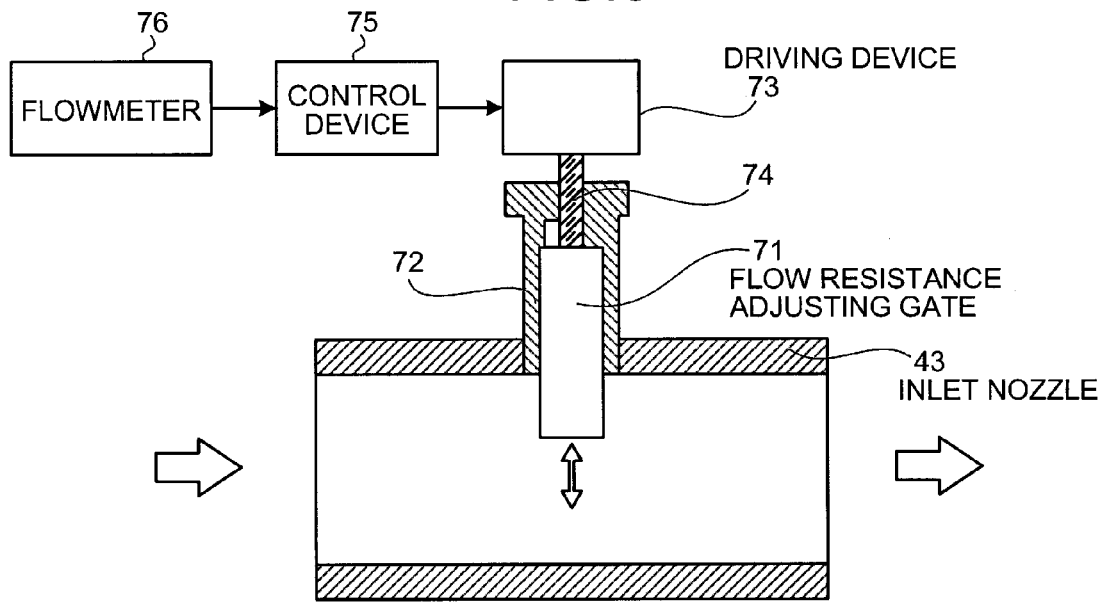
FIG. 6 is a schematic cross section of the inlet nozzle of the incoming water chamber in a steam generator according to a fourth embodiment of the present invention.

FIG. 6 is a schematic cross section of the inlet nozzle of the incoming water chamber in a steam generator according to a fourth embodiment of the present invention. The member having the same function as that of the member described in the above-mentioned embodiments is given the same reference numeral, and an explanation thereof is omitted.

In the steam generator of the fourth embodiment, as shown in FIG. 6, a flow resistance adjusting gate 71 as the flow resistance adjusting unit is supported by a supporting member 72 fixed to the inlet nozzle 43 movably along a radial direction of the inlet nozzle 43. The flow resistance adjusting gate 71 is capable of moving inside the inlet nozzle 43 by moving a screw shaft 74 in the direction of its axis by a driving device 73 and is capable of changing the flow path area for the flow of the primary cooling water in accordance with its moving position. A control device 75 that controls driving of the driving device 73 for the flow resistance adjusting gate 71 is connected with a flowmeter 76 that measures the supply water volume of the primary cooling water flowing from the inlet nozzle 43 into the incoming water chamber (or the drain water volume of the primary cooling water drained from the outgoing water chamber to the outlet nozzle), and the control device 75 moves the flow resistance adjusting gate 71 based on the supply water volume (or the drain water volume) as measured by the flowmeter 76.

Therefore, when damage or the like to the heat-transfer tube 37 is detected in the periodic inspection or the like of the steam generator, the worker or the working robot enters the water chambers through the manholes and performs works of repairing or closing the heat-transfer tube. At this moment, if some heat-transfer tubes are closed and made unusable, the flow resistance of the steam generator is increased and the flow rate of the primary cooling water flowing in the heat-transfer tube group is decreased, thereby lowering the heat recovery efficiency of the heat from the primary cooling water. Therefore, the control device 75 controls the driving of the driving device 73 based on the supply water volume of the primary cooling water flowing from the inlet nozzle 43 to the incoming water chamber as measured by the flowmeter 76, and moves the flow resistance adjusting gate 71, adjusting the flow path area of the inlet nozzle 43 (opening volume of the flow resistance adjusting gate 71) to an optimum value. For this reason, the flow resistance at the inlet nozzle 43 is decreased, thereby decreasing the flow resistance of the steam generator and increasing the flow rate of the primary cooling water flowing in the heat-transfer tube group. As a result, it is possible to restrain the reduction of the heat recovery efficiency of the heat from the primary cooling water.

As above, in the steam generator of the fourth embodiment, the flow resistance adjusting gate 71 as the flow resistance adjusting unit for the primary cooling water is provided movably in the inlet nozzle 43 provided at the incoming water chamber, enabled to move by the driving device 73, and the control device 75 controls the driving of the driving device 73 based on the supply water volume of the primary cooling water flowing from the inlet nozzle 43 into the incoming water chamber as measured by the flowmeter 76.

Therefore, in the existing steam generator, the control device 75 controls driving of the driving device 73 based on the supply water volume of the primary cooling water flowing from the inlet nozzle 43 to the incoming water chamber, and moves the flow resistance adjusting gate 71 to adjust the flow path area of the inlet nozzle 43. Therefore, it is possible to adjust the flow resistance of the primary cooling water to the optimum value. As a result, the flow resistance of the primary cooling water can be adjusted throughout the entire steam generator, which results in restraining the reduction of the heat recovery efficiency.

Fifth Embodiment

Figure 7:
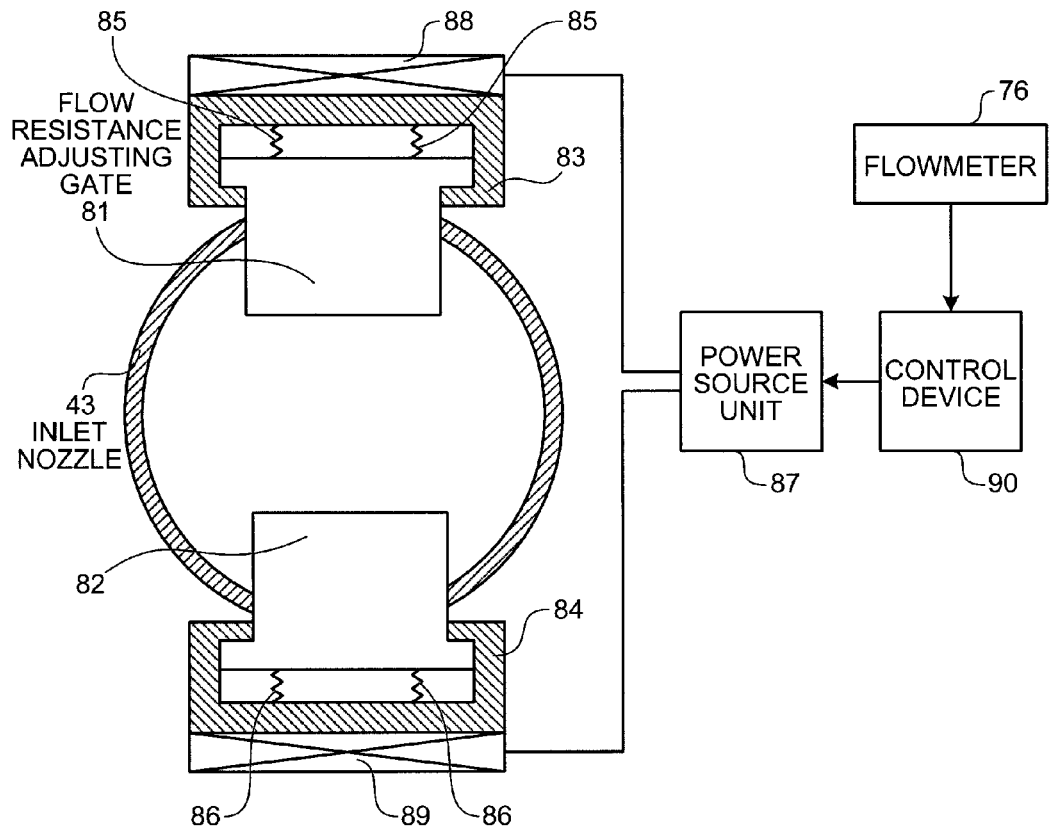
FIG. 7 is a schematic cross section of the inlet nozzle of the incoming water chamber in a steam generator according to a fifth embodiment of the present invention.

FIG. 7 is a schematic cross section of the inlet nozzle of the incoming water chamber in a steam generator according to a fifth embodiment of the present invention. The member having the same function as that of the member described in the above-mentioned embodiments is given the same reference numeral, and an explanation thereof is omitted.

In the steam generator of the fifth embodiment, as shown in FIG. 7, a pair of upper and lower flow resistance adjusting gates 81 and 82 as the flow resistance adjusting unit are supported by upper and lower supporting members 83 and 84 fixed to the inlet nozzle 43 movably along a radial direction of the inlet nozzle 43 to be close to or away from each other. The flow resistance adjusting gates 81 and 82 are supported and pushed by compression coil springs 85 and 86 in such direction that they approach each other, while they are capable of moving in such direction that they move away from each other by the magnetic force generated when coils 88 and 89 are energized by a power source unit 87. It is possible to change the flow path area for the flow of the primary cooling water by changing the moving positions of the flow resistance adjusting gates 81 and 82. A control device 90 that controls driving of the power source unit 87 that energizes the coils 88 and 89 is connected with the flowmeter 76 that measures the supply water volume of the primary cooling water flowing from the inlet nozzle 43 into the incoming water chamber. The control device 90 moves the flow resistance adjusting gates 81 and 82 based on the supply volume water as measured by the flowmeter 76.

Therefore, when damage or the like to the heat-transfer tube 37 is detected in the periodic inspection or the like of the steam generator, the worker or the working robot enters the water chambers through the manholes and performs works of repairing or closing the heat-transfer tubes. At this moment, if some heat-transfer tubes are closed and made unusable, the flow resistance of the steam generator is increased and the flow rate of the primary cooling water flowing in the heat-transfer tube group is decreased, thereby lowering the heat recovery efficiency of the heat from the primary cooling water. Therefore, the control device 90 controls the driving of the power source unit 87 based on the supply water volume of the primary cooling water flowing from the inlet nozzle 43 into the incoming water chamber as measured by the flowmeter 76, and moves the flow resistance adjusting gates 81 and 82, adjusting the flow path area of the inlet nozzle 43 (opening volume of the flow resistance adjusting gates 81 and 82) to an optimum value. In this case, the control device 90 can move only one of the flow resistance adjusting gates 81 and 82 in accordance with the supply water volume of the primary cooling water as measured by the flowmeter 76. The flow resistance at the inlet nozzle 43 is decreased, so that the flow resistance of the steam generator is decreased and the flow rate of the primary cooling water flowing in the heat-transfer tube group is increased. As a result, it is possible to restrain the reduction of the heat recovery efficiency of the heat from the primary cooling water.

As above, in the steam generator of the fifth embodiment, the flow resistance adjusting gates 81 and 82 as the flow resistance adjusting unit for the primary cooling water are supported and pushed by the compression coil springs 85 and 86 and are capable of moving by energizing the coils 88 and 89 from the power source unit 87 at the inlet nozzle 43 provided at the incoming water chamber, and the control device 90 controls the driving of the power source unit 87 based on the supply water volume of the primary cooling water flowing from the inlet nozzle 43 into the incoming water chamber as measured by the flowmeter 76.

Therefore, in the existing steam generator, the control device 90 controls the driving of the power source unit 87 based on the supply water volume of the primary cooling water flowing from the inlet nozzle 43 to the incoming water chamber, and moves the flow resistance adjusting gates 81 and 82 to adjust the flow path area of the inlet nozzle 43. Therefore, it is possible to adjust the flow resistance of the primary cooling water to the optimum value. As a result, the flow resistance of the primary cooling water can be adjusted throughout the entire steam generator, which results in restraining the reduction of the heat recovery efficiency.

In the fourth and the fifth embodiments mentioned above, the control device 75 or 90 controls the driving of the driving device 73 or the power source unit 87 based on the supply water volume of the primary cooling water flowing from the inlet nozzle 43 to the incoming water chamber, moves the flow resistance adjusting gate 71 or the flow resistance adjusting gates 81 and 82, and adjusts the flow path area of the inlet nozzle 43. The flow path area of the inlet nozzle 43 can be adjusted by moving the flow resistance adjusting gate 71 or the flow resistance adjusting gates 81 and 82 in accordance with electricity generated by the nuclear power plant that is correlative to the supply water volume of the primary cooling water.

Sixth Embodiment

Figure 8:
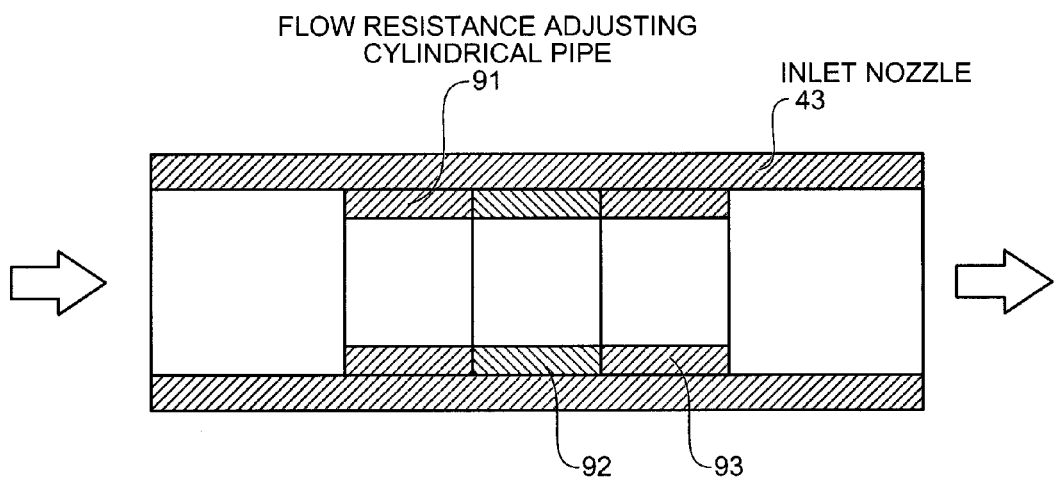
FIG. 8 is a cross section of the inlet nozzle of the incoming water chamber in a steam generator according to a sixth embodiment of the present invention.

FIG. 8 is a cross section of the inlet nozzle of the incoming water chamber in a steam generator according to a sixth embodiment of the present invention. The member having the same function as that of the member described in the above-mentioned embodiments is given the same reference numeral, and an explanation thereof is omitted.

In the steam generator of the sixth embodiment, as shown in FIG. 8, three flow resistance adjusting cylindrical pipes 91, 92, and 93 as the flow resistance adjusting unit are detachably fixed by welding to the inner wall face of the inlet nozzle 43. Therefore, the worker or the working robot can enter the incoming water chamber through the manhole and remove the flow resistance adjusting cylindrical pipes 91, 92, and 93 by cutting away welded parts with the cutting tool from the incoming water chamber.

As above, in the steam generator of the sixth embodiment, the flow resistance adjusting cylindrical pipes 91, 92, and 93 as the flow resistance adjusting unit for the primary cooling water are provided detachably by welding to the inlet nozzle 43 provided at the incoming water chamber.

Therefore, by decreasing the flow resistance at the inlet nozzle 43 by cutting away the welded parts with the cutting tool and removing the flow resistance adjusting cylindrical pipes 91, 92, and 93, in accordance with an increase in the flow resistance of the heat-transfer tube group in the steam generator, the flow resistance of the primary cooling water can easily be adjusted throughout the entire steam generator. In this case, by using the flow resistance adjusting cylindrical pipes 91, 92, and 93 as the flow resistance adjusting unit, the primary cooling water flowing inside can be stabilized.

Seventh Embodiment

Figure 9:
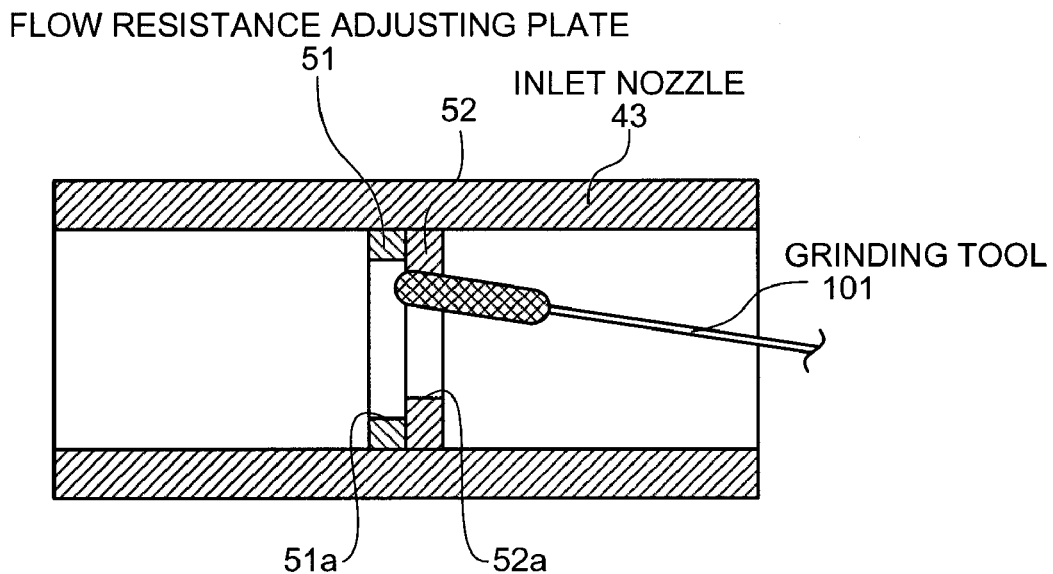
FIG. 9 is a cross section of the inlet nozzle of the incoming water chamber indicating a method of adjusting flow resistance of cooling water in a steam generator according to a seventh embodiment of the present invention.

FIG. 9 is a cross section of the inlet nozzle of the incoming water chamber indicating a method of adjusting the flow resistance of the cooling water in a steam generator according to a seventh embodiment of the present invention. The member having the same function as that of the member described in the above-mentioned embodiments is given the same reference numeral, and an explanation thereof is omitted.

In the steam generator of the seventh embodiment, as shown in FIG. 9, two flow resistance adjusting plates 51 and 52 are fixed detachably by welding to the inner wall face of the inlet nozzle 43. Because the flow resistance adjusting plates 51 and 52 have through holes 51*a* and 52*a* formed at the center having different inside diameters, the plates 51 and 52 have different flow path areas for the flow of the primary cooling water. Therefore, the worker or the working robot enters the incoming water chamber through the manhole, and grinds the inner face of the through hole 52*a* of the flow resistance adjusting plate 52 with a grinding tool 101 from the incoming water chamber, so that the flow path area thereof is adjusted. Further, it is possible to adjust the flow path area of the inlet nozzle 43 by grinding the inner face of the through hole 51*a* of the flow resistance adjusting plate 51 with the grinding tool 101 after cutting away the welded parts and removing the flow resistance adjusting plate 52.

As above, in the steam generator of the seventh embodiment, the flow resistance adjusting plates 51 and 52 as the flow resistance adjusting unit for the primary cooling water are provided in the inlet nozzle 43 provided at the incoming water chamber, and the flow path areas of the inlet nozzle 43 can be adjusted by grinding the inner face of the through holes 51*a* and 52*a* of the flow resistance adjusting plates 51 and 52 with the grinding tool 101 as required.

Therefore, by grinding the inner face of the through holes 51*a* and 52*a* of the flow resistance adjusting plates 51 and 52 with the grinding tool 101 from the incoming water chamber, in accordance with an increase in the flow resistance of the heat-transfer tube group in the steam generator, the flow resistance of the primary cooling water can be decreased at the inlet nozzle 43, so that the flow resistance of the primary cooling water is easily adjusted throughout the entire steam generator. As a result, the flow resistance of the primary cooling water can be finely adjusted in the steam generator.

Eighth Embodiment

Figure 10:
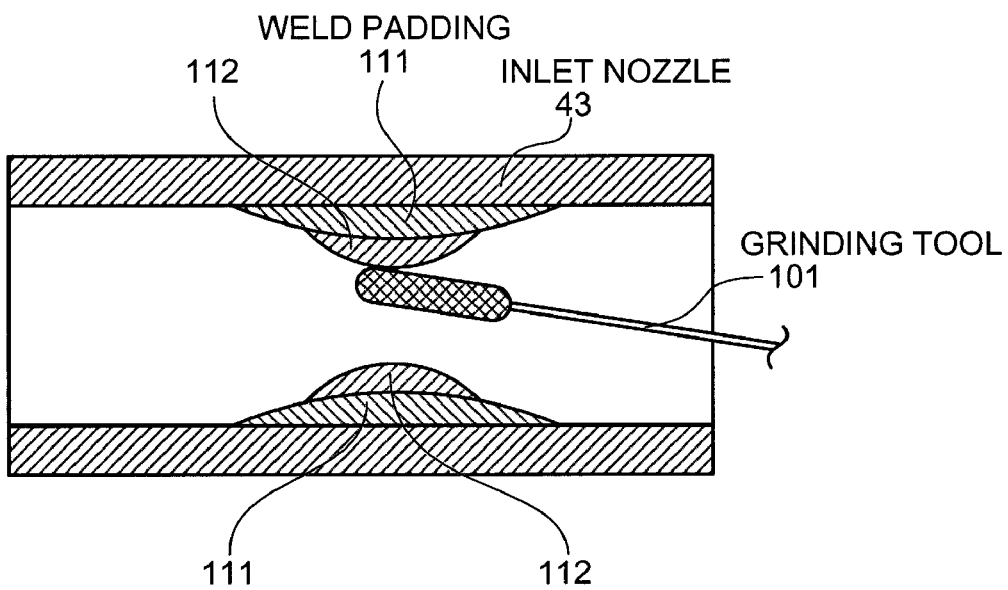
FIG. 10 is a cross section of the inlet nozzle of the incoming water chamber indicating a method of adjusting the flow resistance of the cooling water in a steam generator according to an eighth embodiment of the present invention.

FIG. 10 is a cross section of the inlet nozzle of the incoming water chamber indicating a method of adjusting the flow resistance of the cooling water in a steam generator according to an eighth embodiment of the present invention. The member having the same function as that of the member described in the above-mentioned embodiments is given the same reference numeral, and an explanation thereof is omitted.

In the steam generator of the eighth embodiment, as shown in FIG. 10, weld paddings 111 and 112 as the flow resistance adjusting unit are preformed on the inner wall face of the inlet nozzle 43. Therefore, the worker or the working robot enters the incoming water chamber through the manhole and grinds the surface of the weld paddings 111 and 112 with the grinding tool 101 from the incoming water chamber, thereby adjusting the flow path area thereof.

As above, in the steam generator of the eighth embodiment, by preforming the weld paddings 111 and 112 as the flow resistance adjusting unit in the inlet nozzle 43 provided at the incoming water chamber and grinding the surface of the weld paddings 111 and 112 with the grinding tool 101 as required, the flow path areas thereof can be adjusted.

Therefore, by grinding the surface of the weld paddings 111 and 112 with the grinding tool 101 from the incoming water chamber in accordance with an increase in the flow resistance of the heat-transfer tube group in the steam generator, the flow resistance can be decreased at the inlet nozzle 43 and the flow resistance of the primary cooling water can be easily adjusted throughout the entire steam generator. Thus, the flow resistance of the primary cooling water can be finely adjusted in the steam generator.

In each embodiment mentioned above, the flow resistance of the primary cooling water flowing into the incoming water chamber 41 is adjusted by providing the flow resistance adjusting unit in the inlet nozzle 43. Alternatively, the flow resistance adjusting unit can be provided in the outlet nozzle 44 so that the flow resistance of the primary cooling water drained from the outgoing water chamber 42 is adjusted, or the flow resistance adjusting unit can be provided in the inlet nozzle 43 and the outlet nozzle 44 so that the flow resistance of the primary cooling water flowing into the incoming water chamber 41 and the flow resistance of the primary cooling water drained from the outgoing water chamber 42 are adjusted.

In each embodiment, when damage or the like to the heat-transfer tube 37 is detected in a periodical inspection or the like of the steam generator 13, some heat-transfer tubes 37 are closed, and the flow resistance of the heat-transfer tube group 38 is increased, the flow resistance of the entire steam generator is decreased by decreasing the flow resistance at the inlet nozzle 43. The steam generator and the method of adjusting the flow resistance of the cooling water in the steam generator of the present invention can be applied to other cases. For example, in the case of a work for replacing the stem generator, when such a steam generator is installed that is designed to achieve downsizing by decreasing the number of the heat-transfer tubes while maintaining or enhancing the heat recovery efficiency, the steam generator and the method of adjusting the flow resistance of the cooling water in the steam generator of the present invention can be applied for adjusting the flow resistance of the newly installed steam generator.

INDUSTRIAL APPLICABILITY

The steam generator and the method of adjusting the flow resistance of the cooling water in the steam generator according to the present invention enable the flow resistance of the cooling water in the steam generator to be easily adjusted by providing the flow resistance adjusting unit in the inlet nozzle or the outlet nozzle, and can be applied to any kind of steam generator.

The invention claimed is:

1. The steam generator, comprising:
a hollow sealed barrel;
a heat-transfer tube group that includes a plurality of heat-transfer tubes of an inverted U shape which is arranged inside the hollow sealed barrel and through which a primary cooling water flows;
a tube support that is arranged at a lower part inside the hollow sealed barrel and supports ends of the heat-transfer tubes;
an incoming water chamber that is provided at a lower end of the hollow sealed barrel and communicates with one ends of the heat-transfer tubes;
an outgoing water chamber that is provided at the lower end of the hollow sealed barrel and communicates with other ends of the heat-transfer tubes;
a secondary cooling-water supply channel that supplies a secondary cooling water to the hollow sealed barrel for performing heat exchange with the primary cooling water flowing in the heat-transfer tubes; and
a flow resistance adjusting unit that is provided in at least one of an inlet nozzle provided at the incoming water chamber and an outlet nozzle provided at the outgoing water chamber;
wherein the flow resistance adjusting unit includes a plurality of flow resistance adjusting plates with different flow path areas detachably provided in at least one of the inlet nozzle and the outlet nozzle.

2. The steam generator, comprising:
a hollow sealed barrel;
a heat-transfer tube group that includes a plurality of heat-transfer tubes of an inverted U shape which is arranged inside the hollow sealed barrel and through which a primary cooling water flows;
a tube support that is arranged at a lower part inside the hollow sealed barrel and supports ends of the heat-transfer tubes;
an incoming water chamber that is provided at a lower end of the hollow sealed barrel and communicates with one ends of the heat-transfer tubes;
an outgoing water chamber that is provided at the lower end of the hollow sealed barrel and communicates with other ends of the heat-transfer tubes;
a secondary cooling-water supply channel that supplies a secondary cooling water to the hollow sealed barrel for performing heat exchange with the primary cooling water flowing in the heat-transfer tubes;
a flow resistance adjusting unit that is provided in at least one of an inlet nozzle provided at the incoming water chamber and an outlet nozzle provided at the outgoing water chamber; the flow resistance adjusting unit includes a flow resistance adjusting gate arranged movably along a radial direction of at least one of the inlet nozzle and the outlet nozzle; and
a flowmeter that measures at least one of volume of supply water flowing from the inlet nozzle into the incoming water chamber and volume of drain water drained from the outgoing water chamber to the outlet nozzle, wherein the flow resistance adjusting unit operates the flow resistance adjusting gate based on at least one of the volume of the supply water and the volume of the drain water measured by the flowmeter.

3. The steam generator comprising a hollow sealed barrel;
a heat-transfer tube group that includes a plurality of heat-transfer tubes of an inverted U shape which is arranged inside the hollow sealed barrel and through which a primary cooling water flows;
a tube support that is arranged at a lower part inside the hollow sealed barrel and supports ends of the heat-transfer tubes;
an incoming water chamber that is provided at a lower end of the hollow sealed barrel and communicates with one ends of the heat-transfer tubes;
an outgoing water chamber that is provided at the lower end of the hollow sealed barrel and communicates with other ends of the heat-transfer tubes;
a secondary cooling-water supply channel that supplies a secondary cooling water to the hollow sealed barrel for performing heat exchange with the primary cooling water flowing in the heat-transfer tubes; and
a flow resistance adjusting unit that is provided in at least one of an inlet nozzle provided at the incoming water chamber and an outlet nozzle provided at the outgoing water chamber;
wherein the flow resistance adjusting unit includes a plurality of flow resistance adjusting cylindrical pipes arranged detachably in at least one of the inlet nozzle and the outlet nozzle.

4. The method of adjusting the flow resistance of the cooling water implemented on a steam generator including:
a hollow sealed barrel;
a heat-transfer tube group that includes a plurality of heat-transfer tubes of an inverted U shape which is arranged inside the hollow sealed barrel and through which a primary cooling water flows;

a tube support that is arranged at a lower part inside the hollow sealed barrel and supports ends of the heat-transfer tubes;

an incoming water chamber that is provided at a lower end of the hollow sealed barrel and communicates with one ends of the heat-transfer tubes;

an outgoing water chamber that is provided at the lower end of the hollow sealed barrel and communicates with other ends of the heat-transfer tubes;

a secondary cooling-water supply channel that supplies a secondary cooling water to the hollow sealed barrel for performing heat exchange with the primary cooling water flowing in the heat-transfer tubes, the method comprising adjusting at least one of the flow resistance of the primary cooling water flowing into the incoming water chamber and the flow resistance of the primary cooling water drained from the outgoing water chamber, in accordance with operating condition of the steam generator; and stopping supply of the primary cooling water to the incoming water chamber; opening a manhole for any one of a worker and a working robot to enter at least one of the incoming water chamber and the outgoing water chamber; and adjusting at least one of an opening volume of the inlet nozzle and an opening volume of the outlet nozzle.

* * * * *